United States Patent [19]
Johnston

[11] Patent Number: 5,101,647
[45] Date of Patent: Apr. 7, 1992

[54] UNIVERSAL PORTABLE VEHICLE THROTTLE VALVE LOCK

[76] Inventor: Bobby Johnston, Box 11, Royal, Nebr. 68773

[21] Appl. No.: 637,611

[22] Filed: Jan. 4, 1991

[51] Int. Cl.⁵ .............................. G05G 5/06
[52] U.S. Cl. ............................ 70/199; 70/238; 74/532; 180/335; 254/DIG. 5; 411/384
[58] Field of Search ............ 70/238, 198-200; 411/384; 74/532; 254/DIG. 5; 180/335

[56] References Cited

U.S. PATENT DOCUMENTS

| | | | |
|---|---|---|---|
| 1,007,107 | 10/1911 | Hulsmann | 411/407 X |
| 1,411,728 | 4/1922 | Hogg | 70/200 |
| 1,707,113 | 3/1929 | Christ | 254/DIG. 5 X |
| 2,556,900 | 6/1951 | Buschhorn | 70/200 X |
| 2,596,802 | 5/1952 | Will | 70/200 |
| 2,960,885 | 11/1960 | Donaldson | 74/532 |
| 3,075,402 | 1/1963 | Sellars | 74/532 |
| 3,125,898 | 3/1964 | Maples et al. | 74/532 |
| 3,127,787 | 4/1964 | Fagan | 74/532 |
| 3,225,623 | 12/1965 | Hyman | 74/532 |
| 3,226,997 | 1/1966 | Malloy | 74/532 |
| 3,315,539 | 4/1967 | Solberg | 74/532 |
| 4,432,432 | 2/1984 | Martin | 70/238 X |
| 4,480,496 | 11/1984 | Marshall | 74/532 X |
| 4,779,435 | 10/1988 | Farrow | 70/238 |
| 4,995,250 | 2/1991 | Chiou | 70/198 X |

FOREIGN PATENT DOCUMENTS

| | | | |
|---|---|---|---|
| 2443946 | 8/1980 | France | 70/238 |
| 1107012 | 3/1968 | United Kingdom | 70/238 |
| 2063194 | 6/1981 | United Kingdom | 70/238 |

Primary Examiner—Lloyd A. Gall
Attorney, Agent, or Firm—John A. Beehner

[57] ABSTRACT

A portable vehicle throttle lock which includes a base member having opposite end portions. An accelerator pedal engagement means is formed in or connected adjacent to one of the opposing ends of the base member and a brake pedal engagement means is formed in or connected adjacent to the remaining opposing base member end. Also included are means for adjustably lengthening or shortening the base member. In operation the throttle lock is engaged between the brake and accelerator pedals of a conventional motor vehicle. An operator may lengthen the throttle lock via the adjustable lengthening means in order to adjust the rate of engine shaft rotation. The throttle lock may be manufactured and installed such that an operator may return the engine to idle by simple depressing the accelerator pedal thereby causing the throttle lock to disengage.

2 Claims, 2 Drawing Sheets

UNIVERSAL PORTABLE VEHICLE THROTTLE VALVE LOCK

BACKGROUND OF THE INVENTION

1. Technical Field

The present invention is directed to vehicle throttles adapted to maintain a constant engine r.p.m. and more particularly to portable vehicle throttle valve locks adapted for use on vehicles with adjacent accelerator and brake pedals.

2. Description of the Prior Art

Carbureted and fuel injected internal combustion engines often include a carburetor or inlet manifold with a throttle valve adapted to control the amount of fuel-and-air entering the engine's cylinders. This valve is controlled with either a foot or hand activated pedal linked to the valve. By utilizing the pedal an operator may control the engine shaft rotation speed.

Known to the art of locking throttles are "cruise controls" adapted to govern vehicle speed regardless of engine load. Also known to the art are certain throttle locking devices adapted for use in pleasure boats, aircraft, tractors, and the like. Devices of this type are adapted to selectively maintain a particular throttle valve opening and do not govern rotation under varying loads.

While cruise controls are valuable fatigue reducing devices they are inoperable when the vehicle is not in motion. Likewise, prior art throttle locking devices are not adapted for use with conventional motor vehicles such as automobiles, pickups, and trucks. Additionally, while retrofit throttle locks are commercially available for conventional motor vehicles they are expensive, difficult to install, and become fixtures of the vehicle.

OBJECTS OF THE INVENTION

Therefore, it is a principal object of the present invention to provide a portable universal throttle lock for adjustably setting the throttle valve on motor vehicles equipped with adjacent brake and accelerator pedals.

Another object of the present invention is to provide a portable universal throttle lock that is widely adaptable for use in conventional automobiles, pickups, and trucks.

Another object of the present invention is to provide a portable universal throttle lock that is safe in use and operation.

Another object of the present invention is to provide a portable universal throttle lock which is efficient in operation and refined in appearance.

Another object of the present invention is to provide a portable vehicle throttle lock which is easy to install, simple in construction, and trouble free.

Finally, another object of the present invention is to provide a portable universal vehicle throttle lock which is economical to manufacture and durable in use. These and other objects will be apparent to those skilled in the art.

SUMMARY OF THE INVENTION

The present invention provides a novel method of locking the throttle of a conventional motor vehicle equipped with adjacent brake and accelerator pedals. The portable universal throttle lock includes a base member having opposite end portions. An accelerator pedal engagement means is formed in or connected adjacent to one of the opposing ends of the base member and a brake pedal engagement means is formed in or connected adjacent to the remaining opposing base member end.

Also included are means for adjustably lengthening or shortening the base member. In operation, the throttle lock is engaged between the brake and accelerator pedals of a conventional motor vehicle An operator may lengthen the throttle lock via the adjustable lengthening means in order to further depress the accelerator pedal.

In a preferred embodiment the throttle lock is adapted to engage the brake and accelerator pedals of a motor vehicle such that an operator may return the engine to idle by briefly depressing the accelerator pedal thereby causing the throttle lock to disengage.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

Figure 1:
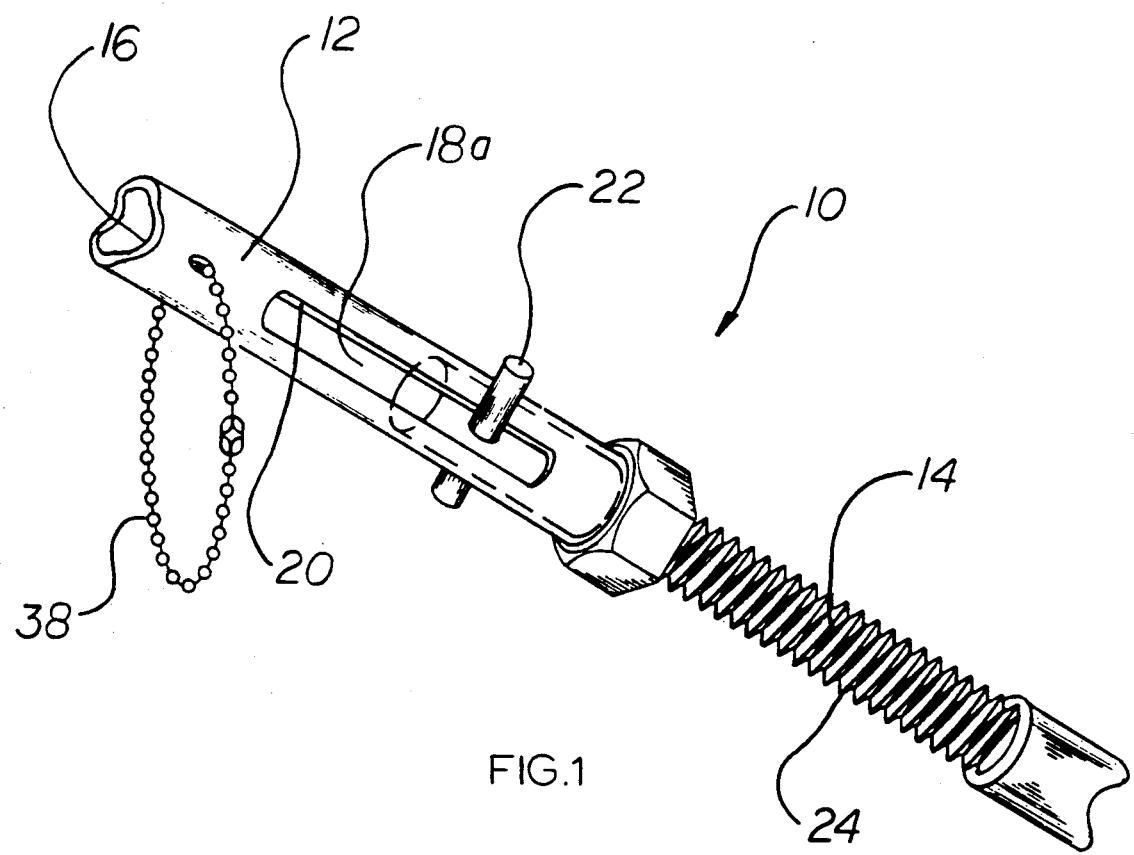
FIG. 1 is a perspective view of a preferred embodiment of the universal portable vehicle throttle.
Figure 2:
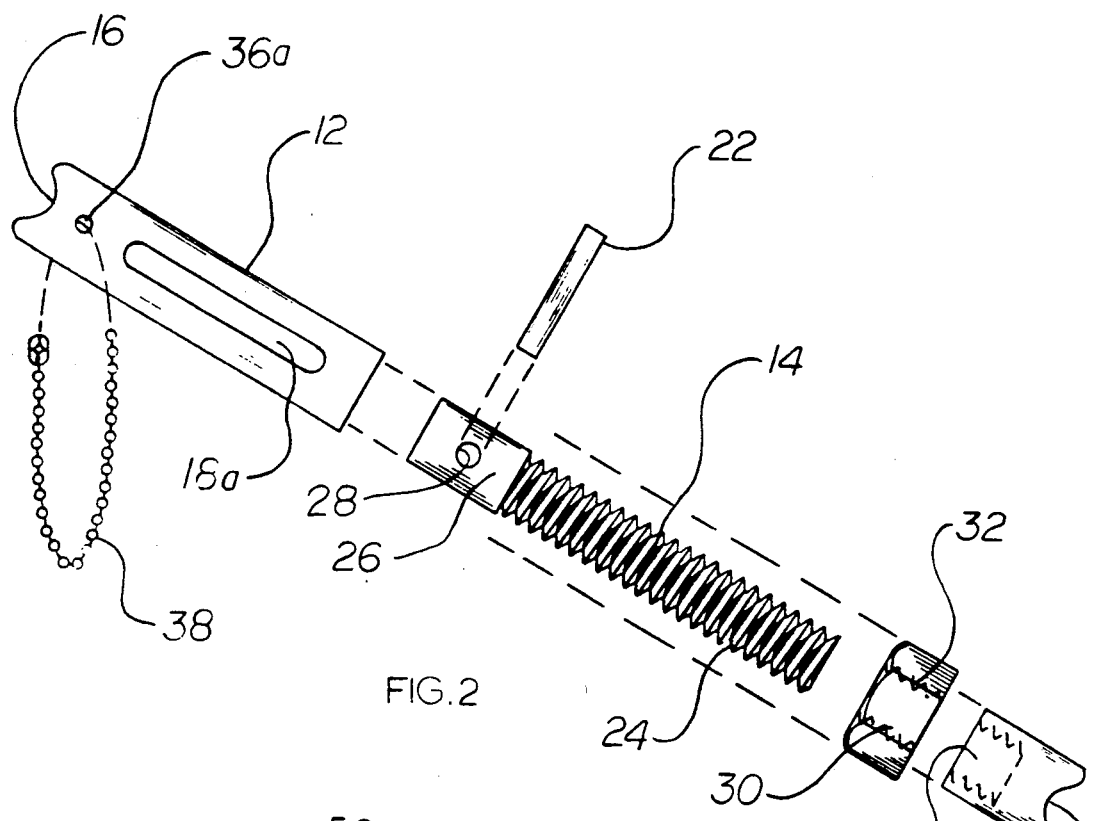
FIG. 2 is an exploded view of a preferred embodiment of the universal portable vehicle throttle showing certain internal structure.
Figure 3:
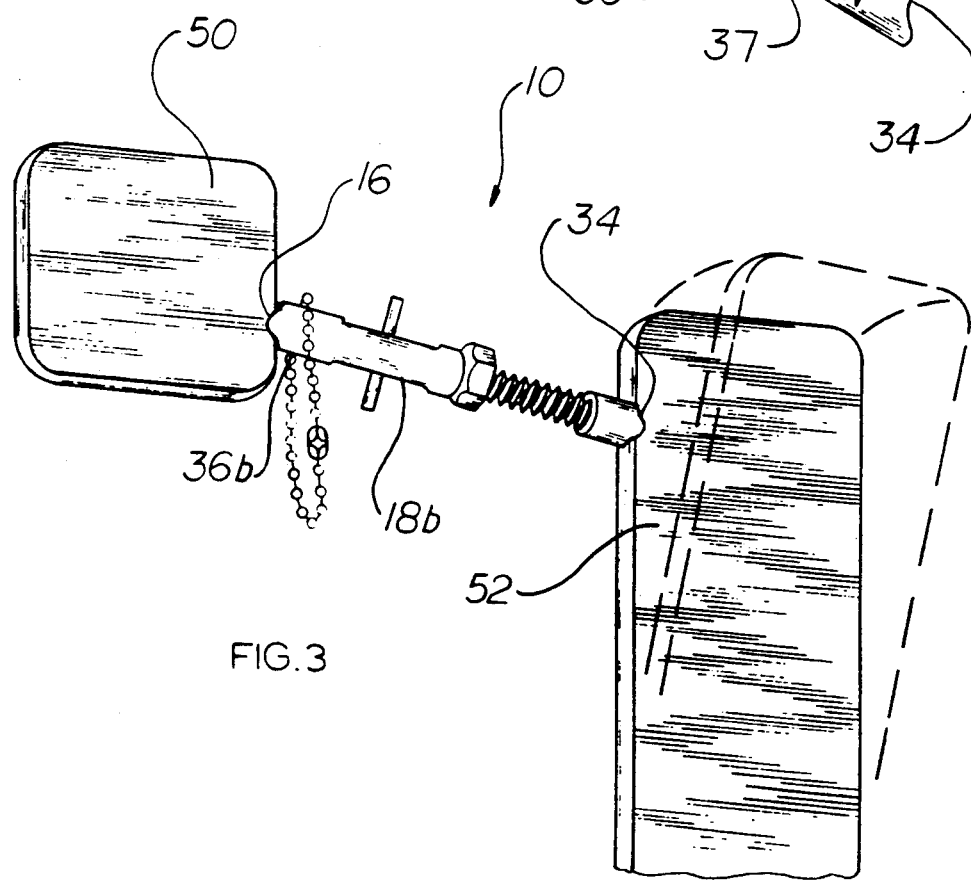
FIG. 3 is a perspective view of a preferred embodiment of the portable vehicle throttle showing the throttle in use.

A preferred embodiment of the present invention 10 is illustrated in FIGS. 1 through 3. The throttle lock 10 includes a base member extension tube 12 adapted to slidably house a base member adjustment bolt 14.

The base member extension tube 12 is preferably formed of a hollow length of aluminum tubing or from a plastic tube formed in an injection mold. In a preferred embodiment the tube 12 is 2.75 inches long with an outside diameter of 0.625 and an inside diameter of 0.5 inches.

The base member extension tube 12 is cupped at one end in order to form an engagement end 16 adapted to engage either the side portion of conventional motor vehicle brake pedal 50 or accelerator pedal 52. A pair of opposing key chain holes (36a and 36b) may also be provided through the base member extension tube 12 so that the apparatus 10 may be secured to a key ring by a chain 38. A pair of longitudinal slots (18a and 18b) are also formed through opposing portions of the tube wall 20 for accommodating an adjustment bolt pin 22.

The adjustment bolt 14 has external threads 24 and a cylindrical un-threaded head portion 26 having a pin hole formed therein adapted to secure an adjustment bolt pin 22. The adjustment bolt is preferably 2.5 inches long having a 2.0 inch threaded portion adapted to threadably engage a nut 30 having internal threads 32.

Also provided is a pedal engagement member 34 having a cupped end surface adapted to engage either the side portion of a conventional motor vehicle brake pedal 50 or accelerator pedal 52. The opposing end of the pedal engagement member 34 is formed as a threaded hole 37 adapted to removably receive the external threads 24 of the adjustment bolt 14.

In operation, the nut 30 may be threadably screwed onto the adjustment bolt 14. Once the nut 30 has traversed several turns of the threads 24 the pedal engagement member 34 may be threadably screwed onto the adjustment bolt 14 until it comes into locked engagement. The cylindrical un-threaded head portion 26 may then be inserted into the base member extension tube 12. The adjustment bolt pin 22 may then be passed through longitudinal slot 18a, pin hole 28, and longitudinal slot 18b. In this way the length of the assembly 10 may be adjusted by rotating the nut 30.

On cold mornings, many individuals are desirous of a means to "warmup" their vehicles. It is the custom of such individuals to start their vehicles on cold mornings and leave them running while they return to the warm confines of their offices or homes. These parties then delay their departure until such time as the engine coolant has reached a sufficient temperature to provide adequate warmth to the vehicle's heater.

Ideally this procedure works well, however, many vehicles are uncooperative in that they are difficult to start and maintain running at an idle. Because of this, many individuals, engaged in the before described custom, are required to make several trips back and forth out-of-doors to restart their vehicle. In this case the present invention 10 may be placed between the right side edge of the brake pedal 50 and the left side surface of the accelerator pedal 52. The length of the apparatus may then be varied in order to depress the accelerator pedal 52 and thereby reduce the likelihood of the engine dying.

Additionally, highway patrolman and the like are often required to sit for long hours in their vehicle. This is especially troublesome during the summer months when temperatures inside the vehicle often exceed those out-of-doors. To combat the heat these individuals run the vehicle's air conditioner. This, however, quickly overloads the idling engine and the engine rapidly overheats. In this case the present invention 10 may be placed between the right side edge of the brake pedal 50 and the left side surface of the accelerator pedal 52. The length of the apparatus may then be varied in order to depress the accelerator pedal 52 and thereby increase the engine shaft rotation rate and power output.

Likewise, batteries often fail to provide sufficient current to start the engine of a particular vehicle. In this case the vehicle must either be "jumped" or towed. Jumping the vehicle is the preferred option since it is less costly. However, it is often the case that the electrical system of the car providing the "jump" is inadequate at an idle to provide sufficient current to start the distressed vehicle. In this case the present invention 10 may be placed between the right side edge of the brake pedal 50 and the left side surface of the accelerator pedal 52. The length of the apparatus may then be varied in order to depress the accelerator pedal 52 and thereby increase the amount of current produced by the electrical system of the samaritan's engine.

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described an improved portable vehicle throttle which accomplishes at least all of the stated objects.

I claim:

1. A method for releasably securing an accelerator pedal in varying degrees of depression comprising,
   a vehicle having an engine, and a brake pedal and an accelerator pedal in spaced apart relation, and a universal portable vehicle throttle lock having; a base member comprising a base member extension tube having one end cupped to form a first pedal engagement means and an adjustment bolt adapted at a first end to be slidably housed within said base member extension tube and a second end cupped to form a second pedal engagement means; and an adjustment nut threadably engaged to said first end of said adjustment bolt whereby said adjustment nut engaged on said bolt may be rotated, thereby varying the length of said base member,
   rotating said adjustment nut to the desired location on said adjustment bolt, thereby adjusting the overall length of said throttle lock,
   inserting said throttle lock between said brake pedal and said accelerator pedal such that said first pedal engagement means releasably engages the side surface of said brake pedal and said second pedal engagement means releasably engages the side surface of said accelerator pedal, thereby releasably holding said accelerator pedal in a depressed position, and supporting said throttle lock in position by upwards pressure from said accelerator pedal,
   adjusting said adjustment nut on said adjustment bolt thereby increasing or decreasing the overall length of said throttle lock and thus varying the degree of depression of said accelerator pedal, and
   manually depressing said accelerator pedal a minimal amount thereby disengaging said first pedal engagement means from said brake pedal and thus releasing said throttle lock from an engaged position.

2. In combination, a vehicle having an engine, and a brake pedal and an accelerator pedal in spaced apart relation, and a universal portable vehicle throttle lock, said throttle lock comprising:
   a base member having opposite end portions;
   first pedal engagement means on said base member adjacent one end portion thereof;
   second pedal engagement means on said base member adjacent the opposite end portion thereof;
   said first and second pedal engagement means further comprising opposite cupped end portions whereby the adjacent side surfaces of said brake and accelerator pedals may be removably engaged;
   length, adjustment means for extending and shortening said base member whereby upon placement of said throttle lock between said brake pedal and said accelerator pedal with said first pedal engagement means engaging said brake pedal and said second pedal engagement means engaging said accelerator pedal said length adjustment means is operable to extend said base member to depress said accelerator pedal and is operable to shorten said base member to accommodate rising of said accelerator pedal;

said base member further comprising a hollow base member extension tube having one end cupped to form said first pedal engagement means, an adjustment bolt at least partially slidably housed within said hollow base member extension tube and a nut threadably engaged on said adjustment bolt whereby rotation of said nut increases or decreases the portion of said adjustment bolt housed within said hollow base member extension tube, thereby increasing or decreasing the length of said base member;

said hollow base member extension tube further comprising a pair of opposing pin engagement slots extended axially along the sides of said tube; and said adjustment bolt having a first end adapted to be slidably housed within said base member extension tube and a second end cupped to form said second pedal engagement means.

* * * * *